(12) United States Patent
Buell et al.

(10) Patent No.: US 9,438,798 B2
(45) Date of Patent: Sep. 6, 2016

(54) SYSTEMS AND METHODS FOR COMBINED STARING AND SCANNING FOCAL PLANE ARRAYS

(71) Applicant: RAYTHEON COMPANY, Waltham, MA (US)

(72) Inventors: David Buell, Goleta, CA (US); John L. Vampola, Santa Barbara, CA (US); Micky R. Harris, Lompoc, CA (US); Steven Botts, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 124 days.

(21) Appl. No.: 14/167,194

(22) Filed: Jan. 29, 2014

(65) Prior Publication Data

US 2015/0215536 A1 Jul. 30, 2015

(51) Int. Cl.
*H04N 5/232* (2006.01)
*H04N 9/10* (2006.01)
*H04N 9/09* (2006.01)
*H04N 5/257* (2006.01)
*H04N 5/225* (2006.01)
*H04N 5/378* (2011.01)
*H04N 5/33* (2006.01)

(52) U.S. Cl.
CPC ........ *H04N 5/23245* (2013.01); *H04N 5/2257* (2013.01); *H04N 5/2259* (2013.01); *H04N 5/257* (2013.01); *H04N 5/33* (2013.01); *H04N 5/378* (2013.01); *H04N 9/09* (2013.01); *H04N 9/10* (2013.01); *H04N 2201/0452* (2013.01); *H04N 2201/0458* (2013.01); *H04N 2209/048* (2013.01)

(58) Field of Classification Search
CPC ............... H04N 2209/048; H04N 2201/0458; H04N 5/23245; H04N 5/2259; H04N 5/33; H04N 9/10; H04N 5/257; H04N 9/09; H04N 5/378; H04N 5/2257; H04N 2201/0452
See application file for complete search history.

(56) References Cited

U.S. PATENT DOCUMENTS

| 6,366,734 | B1 | 4/2002 | Beran et al. |
| 6,658,207 | B1 | 12/2003 | Partynski et al. |
| 2006/0181483 | A1* | 8/2006 | Ari ........................ F41G 3/225 345/8 |
| 2010/0046853 | A1* | 2/2010 | Goodnough ....... H04N 5/37206 382/275 |
| 2012/0250159 | A1* | 10/2012 | Abramovich ........ G02B 27/123 359/618 |
| 2013/0016179 | A1 | 1/2013 | Birkbeck et al. |

FOREIGN PATENT DOCUMENTS

| EP | 0298606 A2 | 1/1989 |
| EP | 0369585 A1 | 5/1990 |

* cited by examiner

*Primary Examiner* — Mekonnen Dagnew
(74) *Attorney, Agent, or Firm* — Lando & Anastasi, LLP (57) ABSTRACT

A combined scanning and staring (SCARING) focal plane array (FPA) imaging system having a plurality of modes of operation is provided. In one example, the SCARING FPA system includes a photodetector array with a plurality of photodetectors arranged in a plurality of photodetector rows, a readout integrated circuit (ROIC) coupled to the photodetector array, and a processor coupled to the ROIC. The processor coupled to the ROIC is configured to dynamically configure the SCARING FPA between a scanning mode of operation and a staring mode of operation.

19 Claims, 5 Drawing Sheets

SYSTEMS AND METHODS FOR COMBINED STARING AND SCANNING FOCAL PLANE ARRAYS

BACKGROUND

Imaging systems may include focal plane arrays (FPA) and processing circuitry to facilitate capturing an image. A focal plane array comprises a plurality of photodetectors arranged in an array to sense incident light in visible and/or non-visible spectra. The processing circuitry receives signals representative of the incident light sensed by the photodetectors and generates an image therefrom.

FPA imaging systems may be constructed using either a staring FPA or a scanning FPA system. Staring FPA systems are constructed to capture an image of an entire field of view simultaneously. Staring FPA systems generally employ a 2-Dimensional array of photodetectors (e.g., a square array of photodetectors) to analyze light representative of the entire field of view simultaneously. In contrast, scanning FPAs are constructed to scan over the desired field of view to form an image. Scanning FPAs are generally 1-Dimensional arrays of photodetectors (e.g., a single row of photodetectors) or short 2-Dimensional arrays of photodetectors (e.g., a narrow rectangular array of photodetectors). Scanning FPA systems typically use a rotating or oscillating mirror to scan light from the scene across the scanning photodetector array.

SUMMARY OF INVENTION

Aspects and embodiments are directed to a combined staring and scanning FPA (i.e., SCARING FPA) system. As discussed in more detail below, various components and features may be combined from scanning FPA and staring FPA systems to form flexible SCARING FPA systems. SCARING FPA systems may select the optimal mode for performing a specific imaging task and thereby offer the advantages of both scanning FPA systems and staring FPA systems simultaneously.

According to one embodiment, a combined scanning and staring (SCARING) focal plane array (FPA) imaging system having a plurality of modes of operation comprises a photodetector array including a plurality of photodetectors arranged in a plurality of photodetector rows, a readout integrated circuit (ROIC) coupled to the photodetector array, and a processor coupled to the ROIC and configured to dynamically configure the SCARING FPA between a scanning mode of operation and a staring mode of operation.

In one example SCARING FPA system, the photodetector array includes a first photodetector sub-array and a second photodetector sub-array. In one example, the ROIC includes a staring array ROIC coupled to the first photodetector sub-array and a scanning array ROIC coupled to the second photodetector sub-array. In one example, the processor is further configured to capture an image by analyzing the light incident on the first photodetector sub-array responsive to the SCARING FPA operating in the staring mode of operation. In one example, the processor is further configured to analyze the light incident on the second photodetector sub-array responsive to the SCARING FPA system operating in the scanning mode of operation.

In one example SCARING FPA system, the ROIC includes a TDI engine. In one example, the processor is further configured to capture a multispectral image by selecting a fragmented subset of photodetectors rows of the plurality of photodetector rows to analyze the incident light. In one example, the processor is further configured to capture a multispectral image by adjusting a gain associated with each photodetector row of the plurality of photodetector rows.

In one example SCARING FPA system, the plurality of modes of operation further includes a search mode wherein the processor is further configured to scan a scene for an object of interest in response to a determination that the SCARING FPA system is in the search mode. In one example, the processor is further configured to scan the scene for an object of interest by matching a known light signature associated with the object of interest with the light incident on the photodetector array. In one example, the processor is further configured to capture an image of the object of interest by configuring the FPA into the staring mode of operation, and controlling the FPA to stare at the object of interest.

According to another embodiment, a method of capturing an image of a scene using a combined scanning and staring (SCARING) focal plane array (FPA) imaging system including a photodetector array comprises selecting one of a staring mode and a scanning mode from a plurality of modes of operation of the SCARING FPA system and capturing the image of the scene according to the selected mode of operation.

In one example, the act of selecting includes selecting the staring mode, and wherein capturing the image includes selecting a staring region of the photodetector array to analyze the incident light. In one example, the act of selecting includes selecting the scanning mode, and wherein capturing the image includes selecting a scanning region of the photodetector array to analyze the incident light. In one example, the act of capturing the image includes capturing a multispectral image. In one example, the act of capturing the multispectral image includes selecting a fragmented subset of photodetectors rows of the photodetector array to analyze the incident light. In one example, the act of capturing the multispectral image includes adjusting a gain associated with each photodetector row of the photodetector array to analyze the incident light.

In one example, the method further comprises scanning the scene for an object of interest. In one example, the act of scanning the scene for an object of interest includes matching a known light signature associated with the object of interest with the light incident on the photodetector array. In one example, the method further comprises capturing an image of the object of interest by selecting the staring mode and controlling the SCARING FPA system to stare at the object of interest.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a combined scanning and staring FPA (i.e., a SCARING FPA) system, which unlike conventional systems, provides flexibility to perform scanning and/or staring operations to image a scene. Scanning techniques are desirable to capture images of a large field of view because, for example, the photodetector array in a staring system may not be sufficiently large to capture the entire desired scene at a high resolution in a single snapshot. In addition, large photodetector arrays used for staring FPA systems may be expensive and thereby cost prohibitive. Scanning techniques, however, may be slower than staring techniques because the image is only captured in small sections and image processing is applied to construct the image from the small sections. Therefore, combing the capabilities of scanning and staring FPA systems offers numerous advantages over conventional FPA imaging systems.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
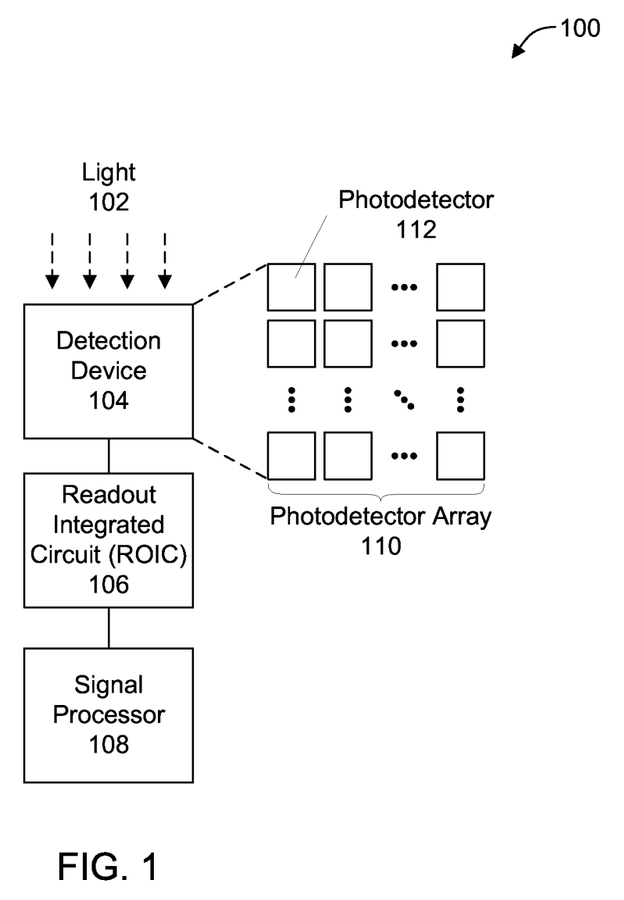
FIG. 1 is a block diagram of one example of a FPA imaging system according to aspects of the invention.

FIG. 1 is a block diagram illustrating an example FPA imaging system 100. The FPA imaging system 100 includes a detection device 104 that includes a plurality of photodetectors 112 arranged in a photodetector array 110 and configured to receive incident light 102. The FPA imaging system 100 further comprises a readout integrated circuit (ROIC) 106 and a signal processor 108.

In one embodiment, the detection device 104 employs a plurality of photodetectors 112 in the photodetector array 110 to receive the incident light 102. The photodetectors 112 are photo-sensitive devices that may accumulate charge (e.g., in a charge coupled device (CCD) sensor) or produce a current and/or voltage (e.g., in a complementary metal oxide semiconductor (CMOS) sensor) in response to light incident upon the photodetector 112. The photodetector 112 may include a photovoltaic detector, a barrier device detector, a position sensitive detector (PSD), or other suitable detector.

In some embodiments, an ROIC 106 is coupled to the detection device 104. The ROIC 106 receives accumulated charge or current and/or voltage signals and digitizes the received information for receipt by a signal processor 108. In the case of a staring FPA system, the ROIC 106 may output digitized information representative of the entire image. In the case of a scanning FPA, the ROIC 106 may digitize and output the received information representative of a section of the image (e.g., the section of the image that was recently scanned). The ROIC 106 may include a time delay and integration (TDI) engine. In scanning FPA system embodiments with a 2-Dimensional photodetector array 110, the TDI engine allows multiple exposures of the same object. For example, incident light from a single object will be captured by each photodetector row in the 2-Dimensional photodetector array 110. As the object passes by each photodetector row, the ROIC 106 may integrate the accumulated charge of each row to achieve a desired level of exposure. Therefore, the exposure time required during the scanning process may be substantially reduced.

In one embodiment, a signal processor 108 is coupled to the ROIC 106 and receives digitized information from the ROIC 106 representative of the incident light 102 on the detection device 104. The signal processor 108 may analyze the captured image and direct various components of the FPA system (e.g., a rotating mirror in the case of a scanning FPA system). The signal processor 108 may be a generic processor. The signal processor 108 may include, for example, other functional components such as a video processing unit, a graphics processing unit, an embedded processor, a single instruction, multiple data digital signal processor (SIMD DSP), and internal memory (not shown).

Figure 2A:
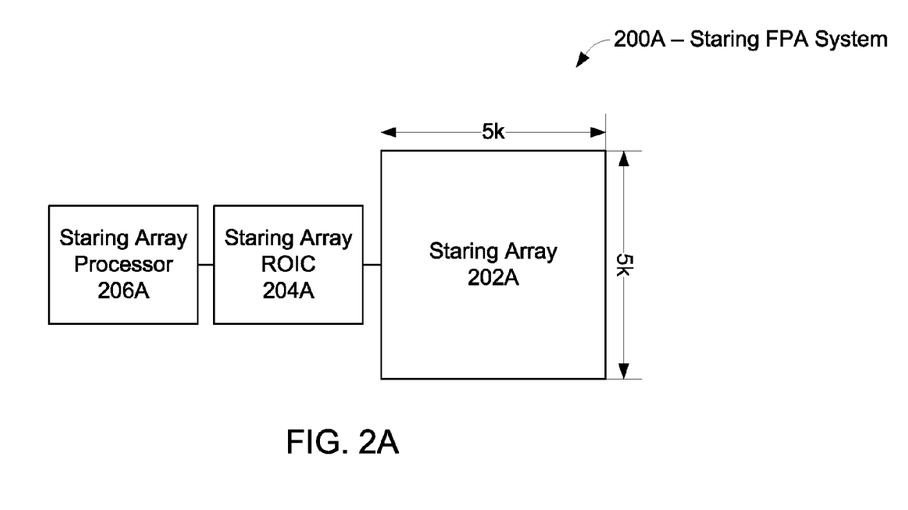
FIGS. 2A and 2B are block diagrams of examples of Scanning and Staring FPA imaging systems.
Figure 2B:
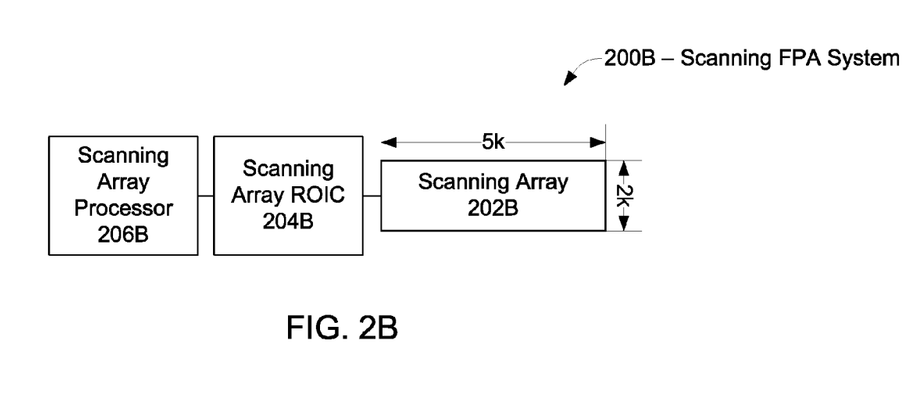

As discussed above, FPA systems may be constructed to be either a staring FPA or a scanning FPA system. FIGS. 2A and 2B are block diagrams illustrating embodiments of staring and scanning FPA systems. FIG. 2A illustrates a staring FPA system 200A that includes a staring array 202A coupled to a starring array ROIC 204A that is in turn coupled to a starring array processor 206A. FIG. 2B illustrates a scanning FPA system 200B that includes a staring array 202B coupled to a starring array ROIC 204B that is in turn coupled to a starring array processor 206B.

The staring imaging system 200A captures images via the staring array 202A. The staring array 202A is a large 2-Dimensional array (e.g., a 5000 by 5000 array of photodetectors). Entire images may be captured simultaneously when light from a given field of view is incident on the staring array 202A. Each photodetector may correspond to a pixel in the output image. As shown in FIG. 2A, the staring array 202A is coupled to the staring array ROIC 204A, which is a staring array processor 206A. The staring array ROIC 204A functions as an interface between the staring array 202A and the staring array processor 206A. The accumulated charge or current and/or voltage signals output by the staring array 202A may not be in the appropriate form for direct processing by the staring array processor 208. Accordingly, the ROIC 204A may aggregate and digitize the accumulated charge or current and/or voltage signals from the staring array 202A for processing by the staring array processor 206A.

Referring to FIG. 2B, as noted above, the scanning imaging system 200B comprises a scanning array 202B, a scanning ROIC 204B, and a scanning array processor 206B. The scanning array 202B may be a rectangular 2-Dimensional array (e.g., a 2000 by 5000 array of photodetectors). The photodetectors of the scanning array 202B receive and analyze light indicative of only a portion of the image at any given time. For example, the scanning array 202B may receive light indicative of a first portion of the scene at a first time and receive light indicative of a second potion of the scene at a second time. Light may be scanned across the scanning array 202B from the scene by, for example, a rotating mirror between an aperture and the scanning array 202B. The scanning array 202B may be coupled to a scanning array ROIC 204B. The scanning array ROIC may incorporate one or more features to improve the quality of the output image and/or the speed at which the image may be captured. As described above, the scanning array ROIC 204B may include a TDI engine to increase the speed at which the scanning imaging system 200B can capture images. The scanning array ROIC may be coupled to a scanning array processor 206B that receives the accumulated charge or current and/or voltage signals from the scanning array ROIC 204B. The scanning array processor 206B may combine received digitized information from the ROIC 204B regarding various segments of the scene into a single image.

Figure 3A:
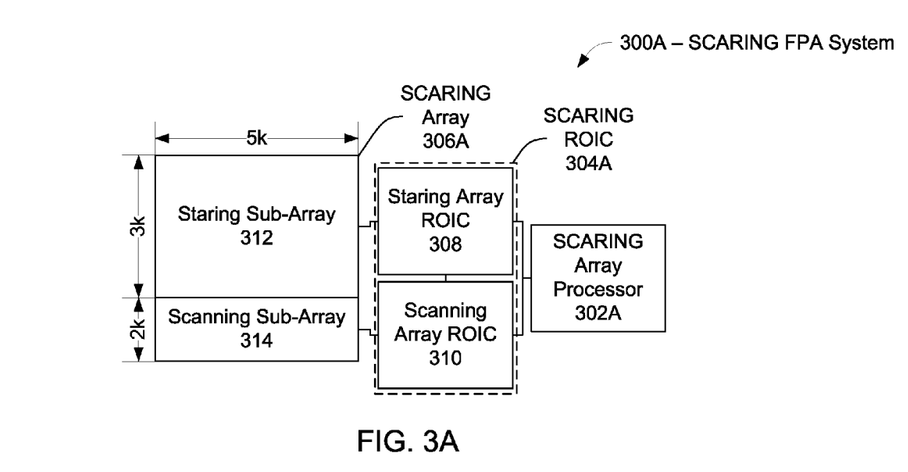
FIGS. 3A and 3B are block diagrams of examples of SCARING FPA systems according to aspects of the invention.
Figure 3B:
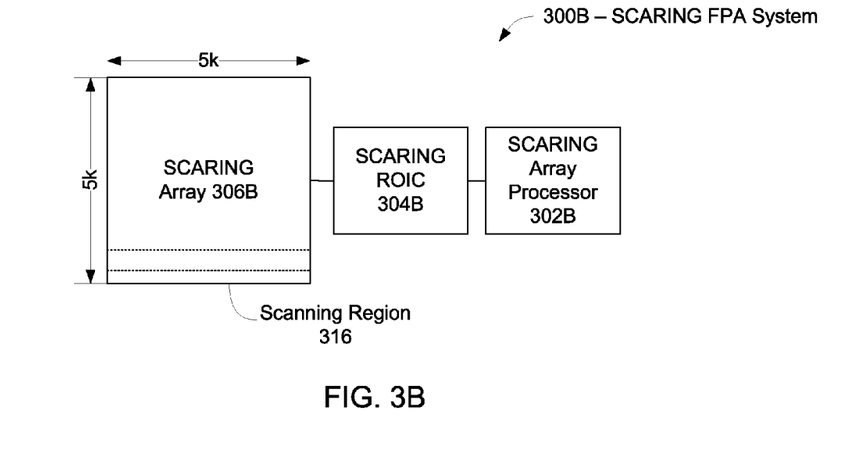

As discussed above, according to certain embodiments, SCARING FPA systems combine the functionality of staring and scanning FPA systems. FIGS. 3A and 3B are block diagrams illustrating examples of SCARING FPA systems. Each of the SCARING FPA systems in FIGS. 3A and 3B may be capable of switching dynamically between staring and scanning modes to capture images, as discussed in more detail below.

Referring to FIG. 3A, the SCARING FPA system 300A comprises a SCARING array 306A including a staring sub-array 312 and a scanning sub-array 314, a SCARING ROIC 304A including a staring array ROIC 308 and a scanning array ROIC 310, and a SCARING array processor 302A. The SCARING FPA system 300A may employ the staring sub-array 226 to capture images by a staring process and the scanning sub-array 314 to capture images by a scanning process. Various processes performed by a SCARING FPA system 300A to capture images are described below with reference to FIGS. 4 and 5. Each of the staring sub-array 312 and the scanning sub-array 314 is coupled to a staring array ROIC 308 and a scanning array ROIC 310, respectively, within the SCARING ROIC 304A. SCARING array 306A does not need to comprise two discrete ROICs (e.g., staring array ROIC 308 and scanning array ROIC 310) but may comprise a single ROIC with the combined functionality of a staring array ROIC and a scanning array ROIC.

Referring to FIG. 3B, the SCARING FPA system 300B comprises a SCARING array 306B including a scanning region 316, a SCARING ROIC 304B, and a SCARING array processor 302B. The SCARING FPA system 300B employs a single continuous array of photodetectors for the SCARING array 306B (e.g., staring array 202A). The SCARING array 306B is coupled to a SCARING ROIC 304B that has the combined functionality of a staring array ROIC (e.g., staring array ROIC 204A) and a scanning array ROIC (e.g., scanning array ROIC 204B). In particular, the SCARING ROIC 304B may include a TDI engine from a scanning array ROIC to improve the speed with which the SCARING FPA system 300B can capture an image via a scanning process. The SCARING FPA system 300B may select a region of the SCARING array to use for the scanning process. The region may comprise, for example, a set of contiguous photodetector rows. Various processes performed by a SCARING FPA system 300B to capture images are described below with reference to FIGS. 4 and 5.

SCARING FPA systems (e.g., SCARING FPA system 300A or 300B) are not limited to capturing images within the visible light spectrum. SCARING FPA systems may receive and analyze light in, for example, the infrared (IR) spectrum. In addition, SCARING FPA systems may capture multispectral images. Multispectral images may be captured by selecting fragmented sets of photodetector rows to analyze the incident light and/or adjust a gain value associated with each photodetector row. For example, the SCARING FPA system may receive a spectrum of incident light including a set of specific light wavelengths of interest. The SCARING FPA system may select a set of photodetector rows to analyze the incident light so as to filter the unwanted wavelengths of light.

Figure 4:
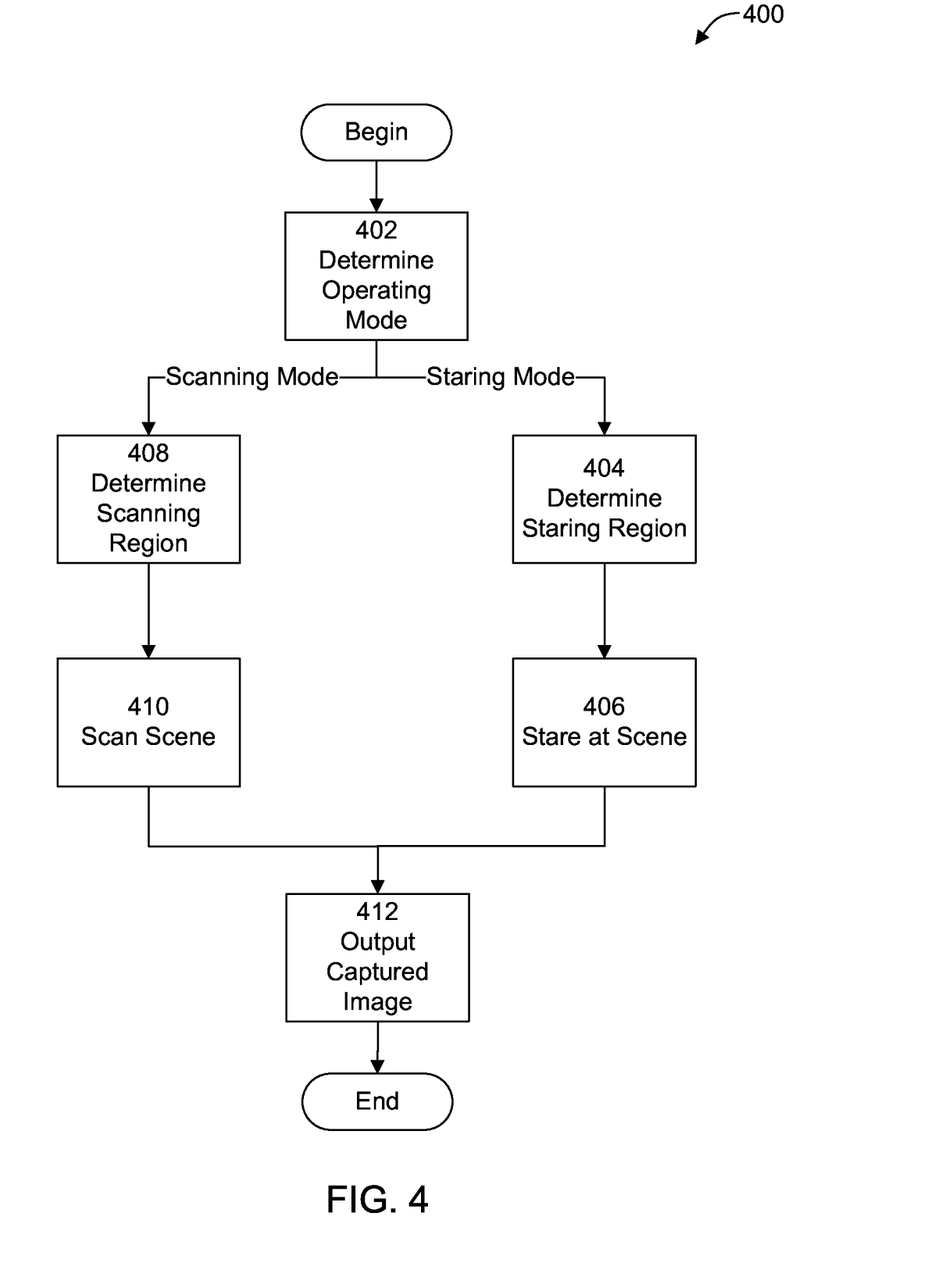
FIG. 4 is a flow diagram of a SCARING FPA system imaging process according to aspects of the invention.

FIG. 4 illustrates an embodiment of a SCARING FPA system imaging process 400. The imaging process 400 enables a SCARING FPA system (e.g., SCARING FPA system 400A or 400B) to capture images. As shown in FIG. 4, the imaging process 400 may begin with determining a mode of operation for the SCARING FPA (act 402). The mode of operation may be selected by an operator of the system, automatically determined by the SCARING FPA based on the current operational scenario, or determined in accord with pre-set operating parameters of the SCARING FPA. Responsive to a determination that the SCARING FPA system is operating in a staring mode, the SCARING FPA determines a staring region 404 and stares at a scene 406 to capture an image. In the scanning mode, the SCARING FPA determines a scanning region 408 and scans the scene 410 to capture the image. The captured image may then be output in act 412.

In act 402, the SCARING FPA system determines a current mode of operation from a plurality of operating modes. In one embodiment, the SCARING FPA system may determine that it is operating in a staring mode or a scanning mode. In the scanning mode, the SCARING FPA system may automatically change operating mode to capture an image by scanning incident light from a scene across a selected portion of a photodetector array. In the staring mode, the SCARING FPA system may automatically change operating mode to capture an image by analyzing the light incident on the entire SCARING array.

In act 404, the SCARING FPA system determines a staring region of the SCARING array in response to a determination that the SCARING FPA system is operating in a staring mode. In the embodiment illustrated in FIG. 3A, the SCARING FPA system 300A may select a predetermined sub-array (e.g., staring sub-array 312). The SCARING FPA system 300A may select the entire SCARING array 306A as the staring region or any subset thereof. In the embodiment illustrated in FIG. 3B, the SCARING FPA system 300B may select a region of contiguous photodetector rows of the SCARING array 306B. For example, the SCARING FPA system 300B may select the entire SCARING array 306B as the staring region.

In act 406, the SCARING FPA system captures an image by staring at the scene. Staring at the scene may involve opening one or more apertures to allow light to hit the photodetector array. Incident light from the photodetector array may be measured by the photodetectors and output to a processor via an ROIC. The SCARING FPA system may proceed to act 412 and output the captured image.

In one embodiment, when the SCARING FPA system determines that it is in the scanning mode, the SCARING FPA system may be configured to capture an image by analyzing the light incident on the entire SCARING array. In act 408, the SCARING FPA system determines a scanning region of the photodetector array in response to a determination that the SCARING FPA is operating in a scanning mode. In the embodiment illustrated in FIG. 3A, the SCARING FPA system 300A may select a predetermined sub-array (e.g., scanning sub-array 314). The SCARING FPA system 300A may select a set of contiguous rows from the staring sub-array 312 as the scanning region. In the embodiment illustrated in FIG. 3B, the SCARING FPA system 300B may select a region of contiguous photodetector rows of the SCARING array 306B (e.g., scanning region 316).

In act 410, the SCARING FPA system captures an image by scanning a scene. Scanning a scene may include opening an aperture to enable light incident on the photodetector array. One or more oscillating or rotating mirrors may be controlled within the SCARING FPA system to pass light from the scene across a photodetector array. The SCARING FPA system may proceed to act 412 and output the captured image. In act 412, the SCARING FPA system outputs the captured image. In one embodiment, outputting the captured image may comprise transmitting to the image to another system. For example, the FPA and ROIC associated with the SCARING FPA system may be mounted on an airborne vehicle. In this example, the SCARING FPA system may transmit image information from the airborne vehicle to an associated ground-based receiver. The SCARING FPA may also display or store the captured image.

Figure 5:
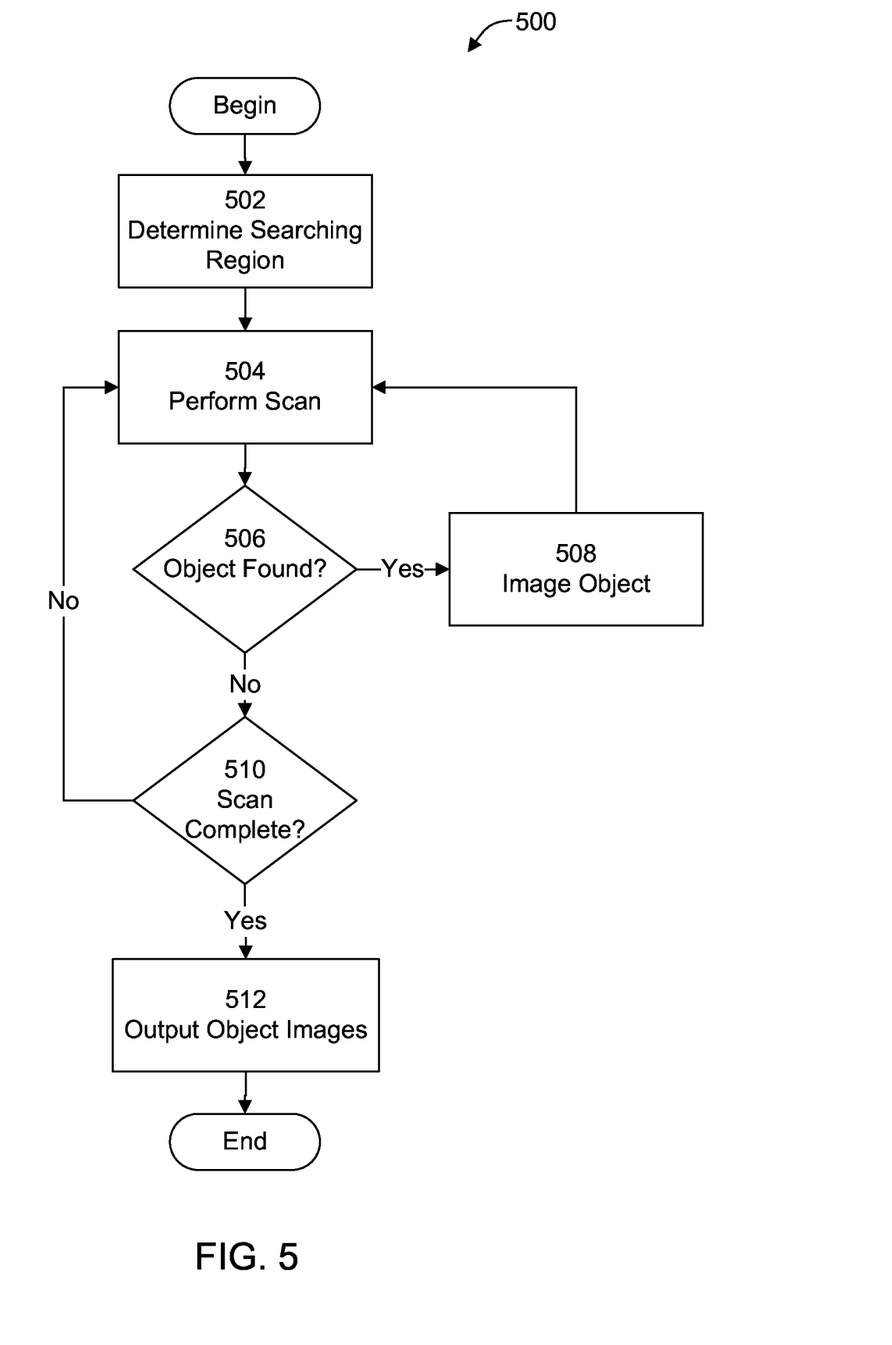
FIG. 5 is a flow diagram of a SCARING FPA system search process according to aspects of the invention.

The SCARING FPA may shift dynamically between the scanning and staring modes to enhance the functionality of the SCARING FPA. For example, the SCARING FPA may further include a search mode where the SCARING FPA searches for specific object within a scene by matching a known light signature of the object with received incident light. The SCARING FPA may then capture an image of the object to output (e.g., to another system). The search process 500 is particularly advantageous because it limits the amount of data that is output by the SCARING FPA system. For example, a single image of an object of interest may be output rather than an image of the entire scene containing the object of interest. The search mode of operation may be selected by an operator of the system or automatically determined by the SCARING FPA based on the current operational scenario. FIG. 5 illustrates an embodiment of a SCARING FPA system search process 500. The search process 500 enables a SCARING FPA system (e.g., SCARING FPA system 300A or 300B) to capture images of specific objects within a scene. As shown in FIG. 5, the SCARING FPA in the search process 500 determines a search region 502 and performs a scan 504. While the SCARING FPA is scanning the scene 504, the SCARING FPA determines whether an object of interest was found (act 506). If the object of interest was found, the SCARING FPA images the object 508 and determines whether the scan is complete 510. The SCARING FPA may then output any captured object images 512.

In act 502, the SCARING FPA system determines a searching region on the photodetector array. The SCARING FPA system may select a fragmented set of photodetector rows to analyze the incident light. As described above, the fragmented set of photodetector rows may be selected so that only specific wavelengths (e.g., wavelengths within the light signature of the object of interest) are captured by the SCARING FPA system.

In act 504, the SCARING FPA system performs a scan of the scene. The SCARING FPA system matches the light incident on the photodetector array with the light signature of the object. In act 506, the SCARING FPA system determines whether an object has been found (e.g., found by a matching light signature). If an object has been found, the SCARING FPA system proceeds to act 508 and captures an image of the object by, for example, performing a staring process on the object before continuing the scan in act 504. Otherwise, the SCARING FPA system proceeds to act 510 where the SCARING FPA system determines whether the scan is complete. If the SCARING FPA system determines that the scan is complete in act 510, the SCARING FPA system proceeds to act 512 and outputs any captured object images. Otherwise, the SCARING FPA system continues performing the scan in act 504.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A combined scanning and staring (SCARING) focal plane array (FPA) imaging system having a plurality of modes of operation, the SCARING FPA system comprising:
   a photodetector array comprising a plurality of photodetectors arranged in a plurality of photodetector rows, the photodetector array including a first photodetector sub-array and a second photodetector sub-array;
   a readout integrated circuit (ROIC) coupled to the photodetector array; and
   a processor coupled to the ROIC and configured to:
      dynamically configure the SCARING FPA between a scanning mode of operation and a staring mode of operation;
      capture a first image by analyzing light incident on the first photodetector sub-array responsive to the SCARING FPA operating in the scanning mode of operation; and
      capture a second image by analyzing light incident on the second photodetector sub-array responsive to the SCARING FPA operating in the staring mode of operation.

2. The SCARING FPA system of claim 1, wherein the ROIC includes a staring array ROIC coupled to the first photodetector sub-array and a scanning array ROIC coupled to the second photodetector sub-array.

3. The SCARING FPA system of claim 2, wherein the processor is further configured to capture the first image by analyzing the light incident on the first photodetector sub-array via the staring ROIC responsive to the SCARING FPA operating in the staring mode of operation.

4. The SCARING FPA system of claim 3, wherein the processor is further configured to capture the second image by analyzing the light incident on the second photodetector sub-array via the scanning ROIC responsive to the SCARING FPA system operating in the scanning mode of operation.

5. The SCARING FPA system of claim 1, wherein the ROIC includes a TDI engine.

6. The SCARING FPA system of claim 1, wherein the processor is further configured to capture a multispectral image by selecting a fragmented subset of photodetector rows of the plurality of photodetector rows to analyze the incident light.

7. The SCARING FPA system of claim 1, wherein the processor is further configured to capture a multispectral image by adjusting a gain associated with each photodetector row of the plurality of photodetector rows.

8. The SCARING FPA system of claim 1, wherein the plurality of modes of operation further includes a search mode, and wherein the processor is further configured to scan a scene for an object of interest in response to a determination that the SCARING FPA system is operating in the search mode.

9. The SCARING FPA system of claim 8, wherein the processor is further configured to scan the scene for an object of interest by matching a known light signature associated with the object of interest with the light incident on the photodetector array.

10. The SCARING FPA system of claim 9, wherein the processor is further configured to capture an image of the object of interest by configuring the SCARING FPA into the staring mode of operation, and controlling the SCARING FPA to stare at the object of interest.

11. The SCARING FPA system of claim 1, wherein the processor is further configured to filter unwanted frequencies from the first image by selecting a fragmented subset of photodetectors rows in the first photodetector sub-array to analyze the incident light.

12. The SCARING FPA system of claim 1, wherein the processor is further configured to filter unwanted frequencies from the first image by adjusting a gain associated with each photodetector row in the first photodetector sub-array.

13. A method of imaging a scene using a combined scanning and staring (SCARING) focal plane array (FPA) imaging system including a photodetector array, the method comprising:
  selecting one of a staring mode and a scanning mode from a plurality of modes of operation of the SCARING FPA system;
  capturing a first image of the scene by analyzing light incident on a first photodetector sub-array of the photodetector array responsive to selecting the staring mode of operation; and
  capturing a second image of the scene by analyzing light incident on a second photodetector sub-array of the photodetector array responsive to selecting the scanning mode of operation.

14. The method of claim 13, wherein capturing the first image includes capturing a multispectral image.

15. The method of claim 14, wherein capturing the multispectral image includes selecting a fragmented subset of photodetectors rows of the first photodetector sub-array to analyze the incident light.

16. The method of claim 14, wherein capturing the multispectral image includes adjusting a gain associated with each photodetector row of the first photodetector sub-array to analyze the incident light.

17. The method of claim 13, further comprising scanning the scene for an object of interest.

18. The method of claim 17, wherein scanning the scene for an object of interest includes matching a known light signature associated with the object of interest with the light incident on the photodetector array.

19. The method of claim 18, further comprising capturing an image of the object of interest by selecting the staring mode and controlling the SCARING FPA system to stare at the object of interest.

\* \* \* \* \*